UNITED STATES PATENT OFFICE.

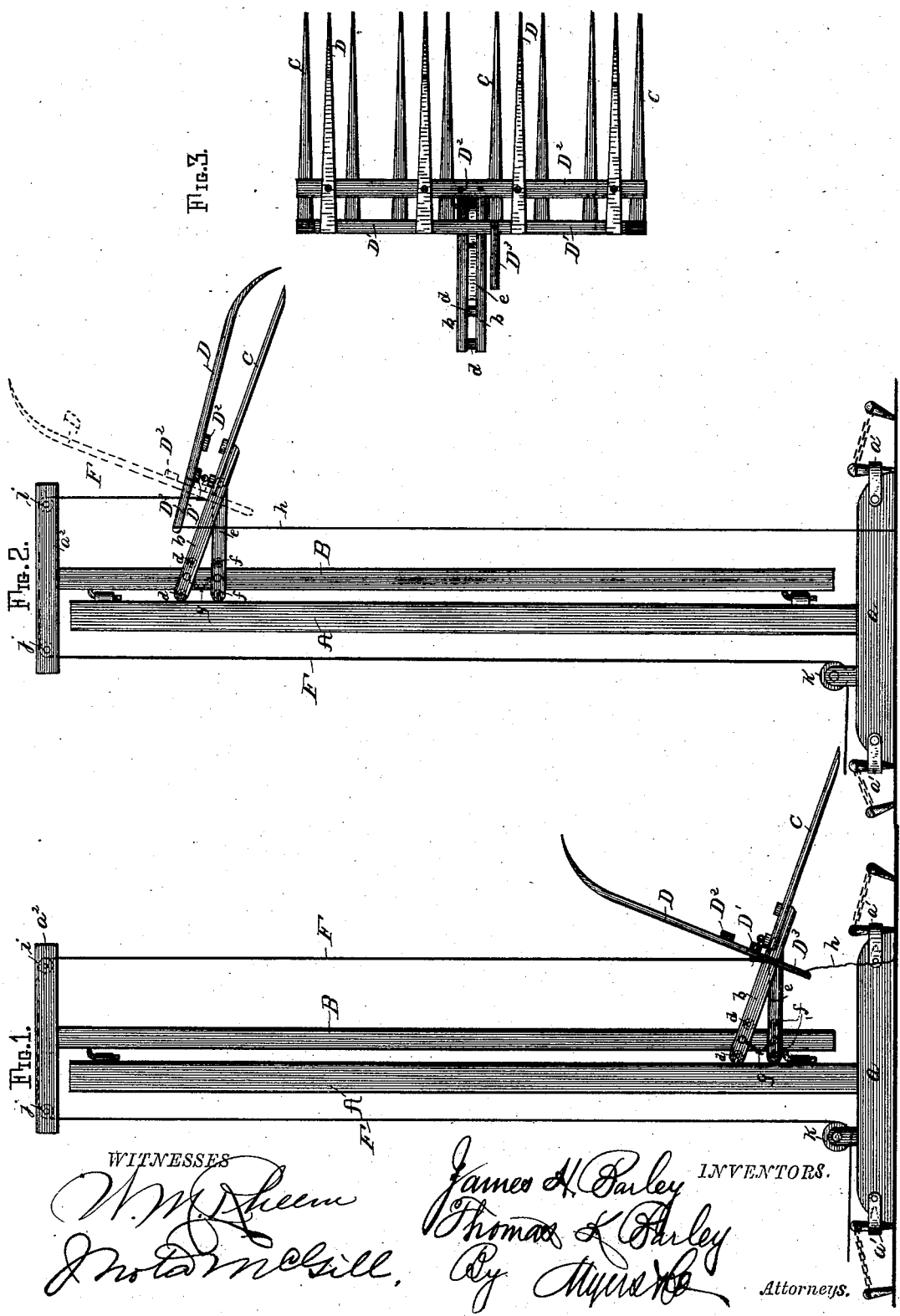

JAMES H. BARLEY AND THOMAS K. BARLEY, OF SEDALIA, MISSOURI.

HAY-STACKER.

SPECIFICATION forming part of Letters Patent No. 302,084, dated July 15, 1884.

Application filed May 12, 1884. (No model.)

*To all whom it may concern:*

Be it known that we, JAMES H. BARLEY and THOMAS K. BARLEY, citizens of the United States of America, residing at Sedalia, in the county of Pettis and State of Missouri, have invented certain new and useful Improvements in Hay-Stackers, of which the following is a specification, reference being had therein to the accompanying drawings.

This invention pertains to improvements in hay-stackers, having for its object to effect the ready elevation and stacking of the hay, and to prevent the same during windy weather from being blown off the fork, and to permit the ready "topping off of the stack;" and the invention consists of the hereinafter described and claimed parts.

In the accompanying drawings, Figure 1 is a view in side elevation of our invention with the fork in its lowered position receiving the hay. Fig. 2 is a similar view with the fork in an elevated position to permit the stacking of the hay. Fig. 3 is a plan view of the fork.

In the organization of our invention we erect a pole or staff, A, securing it upon a base, $a$, which may be secured in place by stakes connected together by a chain or otherwise, one driven into a clip, $a$, connected to the base, and the other driven in the ground. To this pole is hinged an upright, B, which serves, as presently seen, as a rail, and has a cross-piece, $a^2$, fastened to its upper end, the function of which will also appear further on.

C is the fork, which consists of a series of tines fixed to a head, to the center of which is fastened a two-part handle, $b$, having anti-frictional rolls $d\ d$—one arranged between the outer ends of the bars of which the handle is composed and the other arranged a short distance inwardly therefrom.

Between the inner ends of the parts of the handle $b$ is hinged or pivoted one end of the two-part brace $e$, the parts or bars of the latter being also provided with anti-frictional rolls $f\ f$, similarly and coincidently disposed as the rolls $d\ d$ of the handle $b$. The handle and brace are supported in position upon the pole A, their rolls resting against the front and rear sides of the pole, and the handle being so disposed thereon as to allow the fork to have such a slant to the surface of the ground that the hay can be readily raked thereon, while the brace will assume such position to the handle, being prevented from having too great a divergence from the latter by the staying-chain $g$, that the fork will be properly held in position and the handle be prevented from binding upon the pole.

D D are a number of holding-fingers, secured at their inner ends to a cross-bar, D', and connected together by a cross-bar, D², fastened a short distance from the bar D' thereto, said bar D' being hinged to a cross-bar at the inner ends of the tines of the fork C, and having a lever, D³, operated by a cord, $h$, connected to said lever, and of such length as to be within convenient reach when the fork is at its highest point of elevation. The outer ends of the fingers D are pointed or curved downward, and extend adjacently to the outer ends of the fork-tines, to effect the holding upon the fork of its load of hay while being elevated as against slipping or being in windy weather blown therefrom. The fork is raised upon or along the pole A by a rope or chain, F, connected to the fork head or handle C thereof, and passed up over a pulley, $i$, in one end of the upper cross-piece, $a^2$, of the pole A, being next passed over a second pulley, $j$, at the opposite end of said cross-piece, after which it is passed down to and under a third pulley, $k$, in proximity to the base of the pole. To the free end of this rope a horse is designed to be connected for raising the loaded fork. When the fork, with its load, has been raised to the desired elevation, the same is swung around with the hinged upright at right angles to its former position, and the fingers D are elevated, when the stack-builder or attendant can readily remove the hay from the fork to the rising stack. When the stack has risen to the height to need "topping off," the fork, with its load, is elevated to such an extent as to allow of its being held horizontally, the fingers being elevated to permit the "builder" to remove the contents of the fork and then descend from the stack upon the fork. If desired, the fork, or rather its head, may be hinged to the handle, to permit the tilting of the fork in discharging the same.

As the disposition of some of the parts of our above-described invention may be readily varied, it will therefore be understood that we do not restrict the same in that particular.

Having thus fully described our invention, what we claim, and desire to secure by Letters Patent, is—

1. In a hay-stacker, the pole having the hinged upright or rail, with the fork capable of movement thereon, substantially as and for the purpose set forth.

2. In a hay-stacker, the fork having the fixed handle and the fingers hinged to a cross-bar of the fork-tines, said fingers having their outer ends pointed or curved downwardly adjacently to the outer ends of the fork-tines, substantially as and for the purpose set forth.

3. In a hay-stacker, the pole having the hinged rail or upright, with the handle and the brace of the fork sliding upon said hinged rail, and operating cords, ropes, or chains connected to the fork head or handle and a lever of the fingers, and passing over the pulleys, substantially as and for the purpose set forth.

4. The combination of the pole or upright having the hinged rail or bar, and the top cross-piece provided with pulleys at its ends, the fork, and the elevating rope or chain connected to the fork and passing over said pulleys, substantially as shown, and for the purpose set forth.

In testimony whereof we affix our signatures in presence of two witnesses.

JAMES H. BARLEY.
THOMS. K. BARLEY.

Witnesses:
JAMES M. BYLER,
WM. SCOTT.